United States Patent [19]

Coucoulas et al.

[11] Patent Number: 5,389,193
[45] Date of Patent: Feb. 14, 1995

[54] METHODS FOR BONDING ALUMINIZED OPTICAL FIBER

[75] Inventors: Alexander Coucoulas, Basking Ridge; Ranjan Dutta, Lawrenceville; Robert Klaiber, Lebanonon, all of N.J.

[73] Assignee: AT&T Corp., Murray Hill, N.J.

[21] Appl. No.: 167,255

[22] Filed: Dec. 14, 1993

[51] Int. Cl.⁶ .................. H01L 21/306; B44C 1/22
[52] U.S. Cl. ................... 156/633; 156/654; 156/662; 156/647; 385/52
[58] Field of Search .............. 156/629, 633, 643, 647, 156/654, 662, 659.1; 385/52, 65, 83; 65/3.11, 3.3, 4.2, 4.3

[56] References Cited

U.S. PATENT DOCUMENTS

| | | | |
|---|---|---|---|
| 5,006,201 | 4/1991 | Kaukeinen | 156/633 |
| 5,178,319 | 1/1993 | Coucoulas | 228/234 |
| 5,178,723 | 1/1993 | Nguyen | 156/633 |

Primary Examiner—William Powell
Attorney, Agent, or Firm—Roderick B. Anderson

[57] ABSTRACT

Aluminized optical fiber (11) can be permanently bonded to silicon surfaces by applying both heat and pressure to the optical fiber. Thus, an optical fiber (11) can be bonded within a silicon V-groove (16) simply by applying heat and pressure, thereby to give an extremely accurate predetermined alignment of the central axis of the optical fiber within the V-groove, while avoiding the use of any potentially contaminating adhesives. This method can also be used to bond the aluminized fiber to aluminized V-grooves, as is described below.

18 Claims, 1 Drawing Sheet

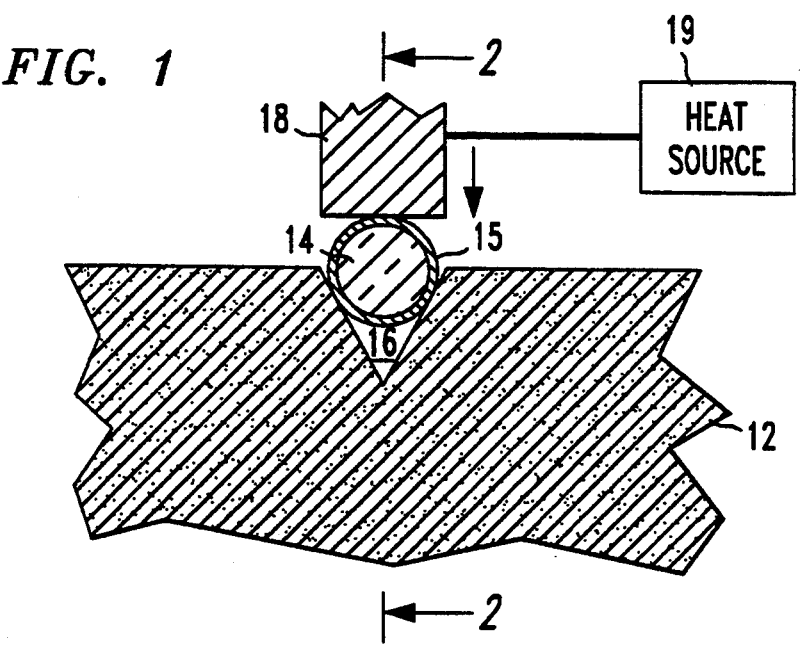
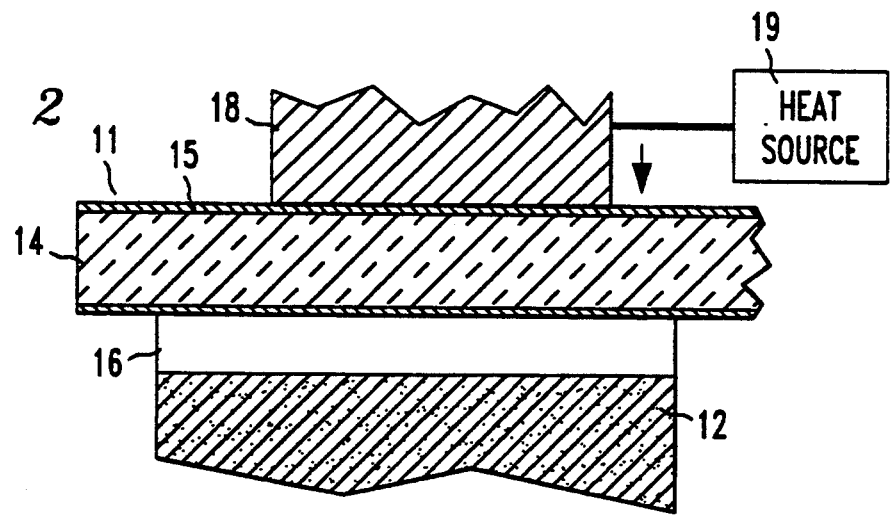
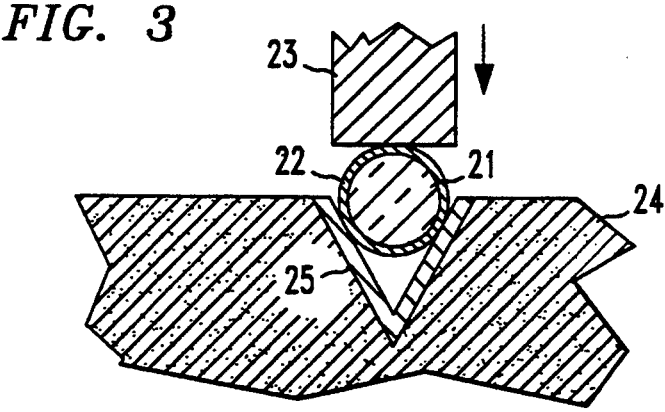

METHODS FOR BONDING ALUMINIZED OPTICAL FIBER

TECHNICAL FIELD

This invention relates to methods for bonding aluminized optical fiber and, more particularly, to methods for bonding aluminized optical fiber to supporting substrates.

BACKGROUND OF THE INVENTION

The patent of H. R. Clark, U.S. Pat. No. 5,017,263, granted May 21, 1991, is an example of the literature showing the use of V-grooves in silicon for holding optical fiber in precise alignment with other optical elements of a photonics package. Monocrystalline silicon is used for such purpose because it etches anisotropically; that is, it etches preferentially along predictable crystallographic planes. As a consequence, appropriate masking and etching can be used to provide supporting sidewalls for an optical fiber that are precisely located. The Clark patent shows how other crystallographic planes of the silicon can be used to locate a lens, a photodetector or other element to be maintained in alignment with the optical fiber. The patent of Ackerman et al., U.S. Pat. No. 5,124,281, granted Jun. 23, 1992, hereby incorporated herein by reference, is another example of the literature showing the use of V-grooves in silicon for holding an optical fiber in precise alignment with other elements.

It is now apparent that aluminized optical fibers are often preferable for making photonics packages of the type described in the Clark or Ackerman et al. patent, because aluminizing makes the fiber much more rugged. Aluminized optical fiber can be held within a V-groove by epoxy, but it is recognized that the use of such adhesives may constitute a source of contamination within the photonics package. Accordingly, it would be desirable to simplify as much as possible the bonding of aluminized optical fiber to substrates, and also to avoid the use of adhesives.

SUMMARY OF THE INVENTION

We have found that aluminized optical fiber can be permanently bonded to silicon surfaces by applying both heat and pressure to the optical fiber. Thus, an optical fiber can be bonded within a silicon V-groove simply by applying heat and pressure, thereby to give an extremely accurate predetermined alignment of the central axis of the optical fiber within the V-groove, while avoiding the use of any potentially contaminating adhesives. This method can also be used to bond the aluminized fiber to aluminized V-grooves, as is described below.

Various other benefits, embodiments and modifications of the invention will be understood from a consideration of the following detailed description taken in conjunction with the accompany drawing.

BRIEF DESCRIPTION OF THE DRAWING

FIG. 1 is a sectional schematic view illustrating a bonding method in accordance with an illustrative embodiment of the invention;

FIG. 2 is a sectional view taken along lines 2—2 of FIG. 1; and

FIG. 3 is a sectional schematic view illustrating another embodiment of the invention.

DETAILED DESCRIPTION

Referring now to FIG. 1, there is shown schematically a portion of a photonics package in accordance with an illustrative embodiment of the invention comprising an aluminized optical fiber 11 which is intended to be bonded to a silicon substrate 12. As is described, for example, in the paper, "Metal Coated Fibers," K. Inada et al., *SPIE Vol. 584, Optical Fiber Characteristics and Standards* (1985), hereby incorporated herein by reference, an optical fiber can be made to be much more robust and less susceptible to cracking or breaking by coating it with a thin coating of aluminum. Thus, the aluminized optical fiber comprises a glass portion 14 having a diameter, for example, of one hundred twenty-five micrometers, coated with an aluminum coating or layer 15 having an outer diameter of one hundred seventy micrometers.

As is known in the art, a V-groove 16 can be made with a great deal of precision in silicon substrate 12 by photolithographic masking and etching. Such etching is anisotropic and can be made very precise by constraining the etching along inherent crystallographic planes of the silicon. Thus, when optical fiber 11 is mounted in the V-groove 16, its position is very precise, as may be required for alignment with other optical elements, such as lenses and the like. Aluminized optical fibers are normally bonded in V-grooves, such as V-groove 16, by the use of an adhesive, such as epoxy. Such adhesives can contaminate component elements of a photonics package, and if their use can be avoided, the design of a photonics package can sometimes be significantly simplified.

We have found that optical fiber 11 can be bonded to silicon substrate 12 through the application of heat and pressure. In FIGS. 1 and 2, a bonding tool 18 heated by a source 19 applies pressure to the optical fiber 11, as indicated by the arrow, while heating the interface of the fiber and substrate 12. For example, a force of fourteen tenths of a gram per micron of length of the optical fiber 11 may be applied at a temperature of four hundred degrees Celsius for a time of five to fifteen seconds. This will result in a bond at the interface of the aluminized optical fiber 11 with the side walls of the silicon substrate V-grooves, such bond having a shear strength from one thousand four hundred to over one thousand six hundred grams.

Both aluminum and silicon inherently form a thin oxide layer upon exposure to air. It is believed that the curved surface of the optical fiber ruptures the inherent coating of the native aluminum oxide of the aluminum film 15 to permit a reaction and bonding of the aluminum with the silicon and/or with the inherent silicon dioxide coating of the substrate. While the heat and pressure may both be applied by a bonding tool 18, as shown by FIGS. 1 and 2, the heat may alternatively be applied by various kinds of ovens, or by heating substrate 12; it is only necessary that the interface of the substrate with the optical fiber be heated to an appropriately high temperature.

Microscopic examination of the V-groove 16 and of an optical fiber, such as fiber 11 after it has been bonded within the V-groove and thereafter broken away from the V-groove, indicates that the bonding results from a fusion of the aluminum layer 15 with the silicon substrate 12. This further buttresses our theory concerning the reason our bonding method works. In distinction, a flat surface of aluminum cannot be bonded to a flat surface of silicon merely by applying heat and pressure, at least without distorting or breaking the components. The pressures applied in our method of course do not crack or otherwise interfere with the glass optical fiber 14.

As can be seen from FIG. 1, the outer periphery of fiber 11 is essentially a circular cylinder which contacts the V-groove side walls along parallel lines. Ideally, since a circle contacts a straight line only at a single point, the contacts of the optical fiber with the side walls of the V-groove 16 are along lines each theoretically having a zero width and an infinitely small area. Thus, the force applied per unit of area (or pressure) is very high, even with a relatively small applied force. It would appear that it is the concentration of the forces along these two lines of contact which permit the oxide coating of the aluminum to be ruptured, thereby to permit bonding. The invention, however, is based upon observed results, rather than relying on any particular theoretical mechanism.

The conditions under which eight experiments were made and the results of those experiments are respectively summarized in Tables I and II.

TABLE I

| Expt No. | Ps gms/$\mu$ | Tp (°C.) | Tk ($\mu$) | L ($\mu$) | Tm (sec) |
|---|---|---|---|---|---|
| 1 | .4 | 300 | 12 | 1500 | 5 |
| 2 | .8 | 300 | 12 | 1500 | 15 |
| 3 | .4 | 300 | 24 | 2500 | 15 |
| 4 | .8 | 300 | 24 | 2500 | 5 |
| 5 | .4 | 450 | 24 | 1500 | 5 |
| 6 | .8 | 450 | 24 | 1500 | 15 |
| 7 | .4 | 450 | 12 | 2500 | 15 |
| 8 | .8 | 450 | 12 | 2500 | 5 |

TABLE II

| Expt No. | Strength in Grams | | |
|---|---|---|---|
| | 1 | 2 | 3 |
| 1 | 200 | 180 | 200 |
| 2 | 280 | 400 | 400 |
| 3 | 440 | 360 | 380 |
| 4 | 680 | 560 | 480 |
| 5 | 1440 | 1560 | 1640 |
| 6 | 2040 | 2160 | 2200 |
| 7 | 800 | 1000 | 920 |
| 8 | 1320 | 1400 | 1280 |

The first column of the two tables refers to the experiment number. In Table I, Ps is the applied force in grams per micrometer (along the axial length of the fiber), Tp is the interface temperature in degrees Celsius, Tk is the thickness of the aluminum film 15 in micrometers, L is the length of the bonding tool 18 of FIG. 2 along the fiber axis in micrometers, and Tm is the bonding time in seconds.

Table II shows the shear strength in grams of three runs of bonds for each experiment number. One can see that the best results were obtained in Experiments five through eight, which appear to indicate that an applied temperature of four hundred fifty degrees Celsius works better than only three hundred degrees Celsius. The force applied in grams per micrometer of optical fiber length were all sufficiently small to avoid any damage to the optical fiber. The applied force is the pressing force between the bonding tool 18 and the substrate 12. Whether the bonding tool is forced downwardly, as shown in FIG. 2, or the substrate 12 is forced upwardly against the bonding tool, of course would make no difference.

An advantage of the FIG. 1 method is that one need not use either any adhesive in the V-groove, nor any aluminum to coat the side walls of the V-groove. However, if one wishes to coat the side walls of the V-groove with aluminum, as shown in FIG. 3, we have found that the aluminized optical fiber will still bond to the V-groove. That is, in FIG. 3, a glass optical fiber 21 is coated with an aluminum layer 22 and is pressed by a bonding tool 23 against a substrate 24 having a V-groove which has been coated with an aluminum layer 25. Substrate 24 may be silicon to which aluminum can be bonded, for example, by using an intermediate layer of chromium, as is known in the art. Although a flat surface of aluminum cannot normally be bonded to another flat surface of aluminum merely by the application of heat and pressure, at least without severe distortion of the aluminum, we have found that the method of FIG. 3, using approximately the same parameters as applied to the method of FIG. 1, will effect a bond between the aluminum layer 22 and the aluminum layer 25. The reason for this appears to be the same as applies to FIG. 1; both the aluminum layers 22 and 25 have an inherent aluminum oxide coating, which is apparently ruptured by the application of a high pressure at a high temperature. Also, the glass 21, while it is relatively fragile, is also relatively inflexible, and it efficiently transmits forces that are in turn concentrated at the points of contact.

The various embodiments are intended to be only representative of the inventive concepts involved. While the embodiments show bonding within a V-groove, bonding can be made between an aluminized fiber and other surface configurations of a substrate, e.g., a flat surface. The silicon substrate could include on its bonding surface an intentionally grown layer of silicon dioxide. Various other embodiments and modifications may be made by those skilled in the art without departing from the spirit and scope of the invention.

We claim:

1. A method for bonding an aluminized optical fiber to a silicon substrate comprising the steps of:
    contacting the aluminized optical fiber to a surface of the silicon substrate to define an interface therebetween;
    and simultaneously pressing together the aluminized optical fiber and the silicon substrate, and heating the interface of the fiber and the substrate, the heat and pressure being the only energy applied to the interface.

2. The method of claim 1 further comprising the steps of:
    first forming a V-groove in the silicon substrate;
    and locating the aluminized optical fiber in the V-groove prior to applying heat and pressure, whereby the optical fiber contacts two surfaces of the silicon substrate.

3. A method for bonding an optical fiber to a substrate comprising the steps of:
    forming a layer of aluminum on an optical fiber;
    forming a V-groove in a substrate;
    locating the optical fiber in the V-groove such that the layer of aluminum contacts side walls of the V-groove;
    and simultaneously applying heat and pressure to the portion of the optical fiber located in the V-groove to make a permanent bond between the aluminum layer of the optical fiber and the substrate.

4. The method of claim 3 wherein:
the optical fiber comprises glass;
and the substrate comprises silicon.

5. The method of claim 4 wherein:
sufficient pressure is applied to the optical fiber to cause it to break an inherent thin layer of aluminum oxide on the outer walls of the aluminum layer, thereby to allow a bonding of the aluminum of the aluminum layer with silicon of the substrate.

6. The method of claim 3 wherein:
the side walls of the V-grooves are coated with aluminum;
and sufficient pressure is applied to break inherent layers of aluminum oxide on the optical fiber layer and the V-groove coating, thereby to allow a bonding of the aluminum of the aluminum layer with the aluminum of the V-groove coating.

7. The method of claim 3 wherein:
the optical fiber comprises a glass fiber approximately one hundred twenty-five microns in diameter;
and the aluminum layer is between twelve and twenty-four microns in thickness.

8. The method of claim 7 wherein:
sufficient heat is applied to heat the portion of the optical fiber located in the V-groove to a temperature in excess of about three hundred Celsius;
and the pressure applied is in excess of about 0.4 grams per micron of length of the fiber to which the force is applied.

9. The method of claim 8 wherein:
the temperature is about four hundred fifty degrees Celsius;
and the time during which the pressure is applied is between five and fifteen seconds.

10. A method for bonding an optical fiber to a support member comprising the steps of:
aluminizing an optical fiber by forming a layer of aluminum on at least an end portion of a glass optical fiber;
contacting the aluminized optical fiber to a flat surface of the support member;
the flat surface being parallel to a central axis of the fiber, whereby the contact points of the fiber with the surface describe a straight line;
and simultaneously heating and pressing together the aluminized optical fiber and the support member;
said applied heat and pressure being sufficient to cause bonding of the aluminized optical fiber to the support member, but being insufficient to distort or crack said glass optical fiber.

11. The method of claim 10 wherein:
the support member is made of silicon.

12. The method of claim 11 wherein:
the heat and pressure is sufficient to cause fusion of silicon of said support member with aluminum of said aluminized optical fiber.

13. The method of claim 12 wherein:
the aluminized optical fiber is located in a V-groove of said support member, whereby contact points of the fiber with the support member surface describe two parallel straight lines;
sufficient heat is applied to heat the portion of the aluminized optical fiber located in the V-groove to a temperature in excess of about three hundred degrees Celsius;
and the pressure applied is in excess of about 0.4 grams per micron of length of the fiber to which the force is applied.

14. The method of claim 13 wherein:
the thickness of the aluminum layer is between twelve and twenty-four micrometers;
and the time during which the pressure is applied is between five and fifteen seconds.

15. Apparatus comprising:
a monocrystalline substrate having a V-groove formed therein;
and an aluminized optical fiber disposed in said V-groove and bonded to said substrate by the application of heat and pressure to the interfaces between said aluminized optical fiber and said substrate.

16. The apparatus of claim 15 wherein:
the optical fiber comprises glass;
and the substrate comprises silicon.

17. The apparatus of claim 16 wherein:
the optical fiber comprises a central portion of glass approximately one hundred twenty-five microns in diameter and an outer layer of aluminum between about twelve and about twenty-four microns thick.

18. The apparatus of claim 15 wherein:
the optical fiber is bonded to the substrate by fusion between the aluminized optical fiber and the substrate, there being no adhesive between the aluminized optical fiber and the substrate.

* * * * *